United States Patent Office 3,256,473
Patented June 14, 1966

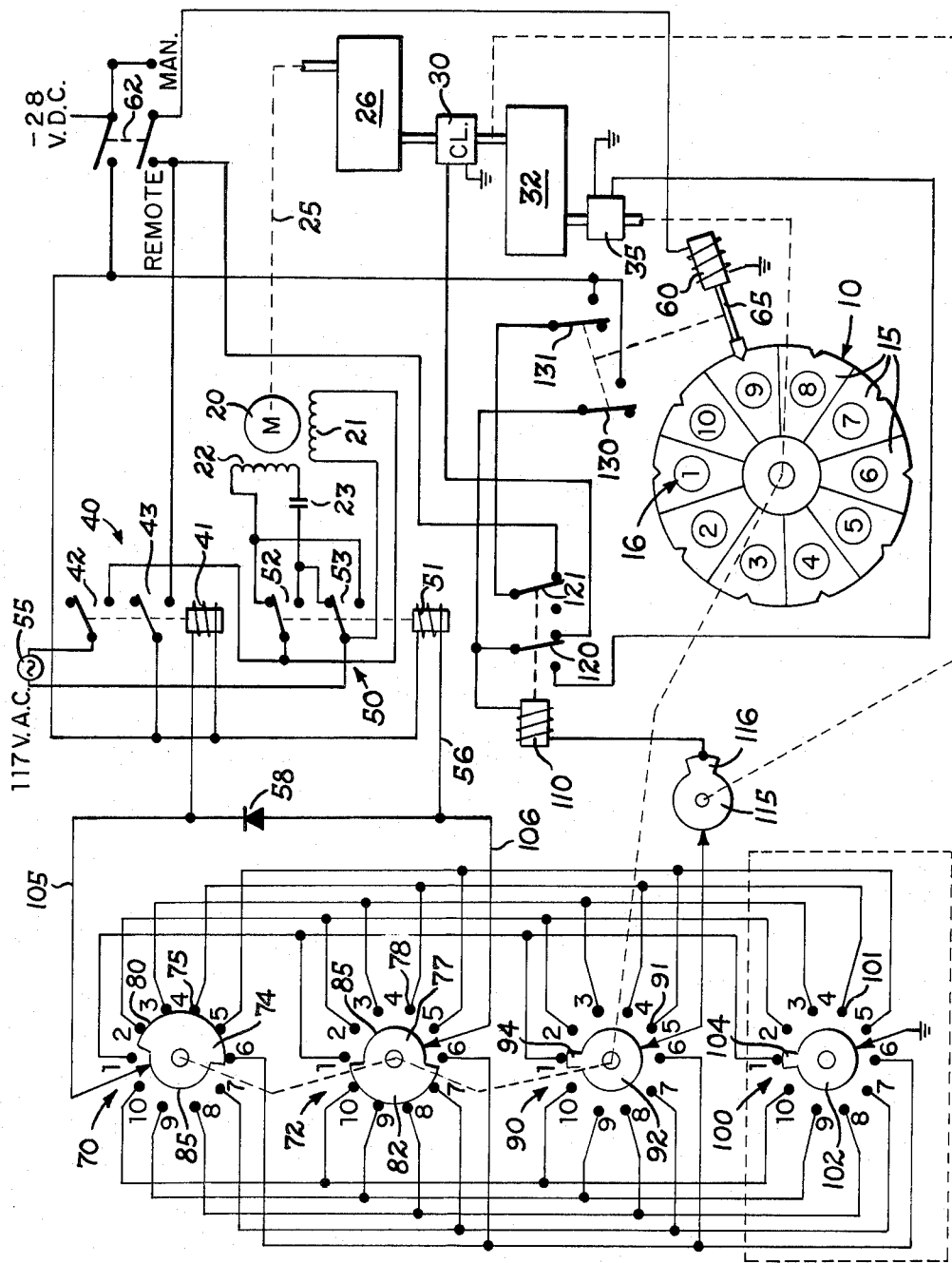

3,256,473
INDEXING CONTROL SYSTEM
Nicholas T. Simopoulos and William W. Shock, Dayton, Ohio, assignors to Dayton Electronic Products Company, Inc., Dayton, Ohio, a corporation of Ohio
Filed May 29, 1963, Ser. No. 284,180
4 Claims. (Cl. 318—33)

This invention pertains to indexing control systems and more particularly to a system for positioning a rotatable member to any one of a plurality of selected positions by way of the shortest path of rotation to that selected position.

In many control systems for the positioning of a rotatable member, such as a turret, it is often desirable to reduce the amount of time which it takes for the rotatable member to arrive at the selected position by rotating the member only in a direction to bring it to the selected position in the shortest period of time. For example, in a turret which is rotatable through three hundred and sixty degrees, it can be rotated from a zero degree fixed reference position to a two hundred seventy degree fixed reference position counterclockwise in about one-third of the time that it would take to reach this position with clockwise rotation.

It is therefore a principal object of this invention to provide a control system for a rotatable member which operates to turn the member to a selected position by way of the shortest path.

The control system of this invention has particular applicability to the control of a turret which has a plurality of angularly spaced separate selectable positions to provide for the selection of any one of the positions by rotation of the turret along the shortest path to the position selected.

A further object of this invention is to provide a turret indexing control as outlined above wherein provision is made for the remote selection of a plurality of turret positions.

Another object of this invention is to provide an indexing control system for the control of a reversible drive for positioning a rotatable member into any one of a plurality of selectable positions by rotation in the direction nearest to the selected position.

A still further object of this invention is the provision of a rotatable member indexing control system, as outlined above, further including automatic clutch and brake controls which are effective to stop the turret or rotatable member in accurately predetermined indexed positions.

Another object of this invention is to provide an indexing control system which is characterized by simplicity and a minimum of operating parts and components.

These and other objects and advantages of the invention will be apparent from the following description, the accompanying drawings and the appended claims.

The single figure of drawing shows a wiring diagram of the control system of this invention as applied to the control of a rotatable turret having a plurality of angularly selectable positions.

Referring to the drawing which illustrates a preferred embodiment of this invention, a turret which is to be controlled by the system of this invention is illustrated at 10 as being mounted for rotation on a shaft 11. The turret 10 is shown as being provided with ten angularly spaced selectable positions or stations, as an example only. It is within the scope of this invention to provide a control system wherein the rotatable member has any convenient number of such positions either equally spaced from each other or spaced irregularly from each other, as conditions may require. For instance, the turret 10 may support a plurality of individual films or map holders 15, as described and claimed in the copending application Serial No. 284,143, filed concurrently herewith for selected viewing at a relatively fixed viewing station such as indicated at 16. As a further example, each film may represent a line drawing of a map of a particular area or range of a radar scope for remote selection by a radar approach control operator. It thus becomes important that the operator be able to select any one of the plurality of stations or maps on the turret and for the turret control system to move the turret in such a manner as to bring the selected map into the projection station in a minimum of time. Therefore, in the preferred embodiment of the invention, the turret 10 need not rotate through more than one hundred eighty degrees in bringing any map holder 15 into alignment with the station 16.

Reversible drive means for the turret 10 includes a reversible electric A.C. motor 20 which is provided with the normal field 21 and the phase quadrature field 22 and starting capacitor 23. The motor 20 is connected to drive the turret 10 through a shaft indicated diagrammatically at 25 which is connected, for convenience, to a first gear reduction means 26. The output of the gear reduction means 26 is applied to an electrically controllable clutch 30 to a second gear reduction means 32. The output of the second gear reduction means 32 is connected to the turret shaft 11 through an electrically controllable brake 35. The clutch 30 and brake 35 are preferably each of the type which remain ineffective when no current is applied to the electric operating coil. Therefore, the clutch 30 is open and the brake 35 is released when their respective coils are not energized.

It is to be understood that the invention, in its broader aspects, is not limited to the use of an A.C. motor 20, nor is it limited to the use of an electric motor, and any controllable reversible drive means for the turret 10 may be employed. Reversible input means for the motor 20 for effecting selection between clockwise and counterclockwise rotation includes a first relay 40 having a relay coil 41 and a pair of single pole double throw contacts 42 and 43. Second input means for the motor 20 for effecting rotation in the reverse direction, such as the counterclockwise direction includes the second control relay 50, similar to the relay 40, which includes a coil 51 connected electrically in parallel with the coil 41 through the diode 58. The relay 50 also includes pairs of contacts 52 and 53 corresponding to the contacts 42 and 43 of relay 40.

When relay 40 is energized, its contacts 42 apply power from a 117 volt A.C. source 55 to the field winding 21 and through the normally closed contacts 52 and 53 of relay 50 to the phase quadrature or starting field 22, to effect appropriate rotation of the motor 20 in one direction, for instance, the clockwise direction when viewing the turret 10 from above. Rotation in the counterclockwise direction is effected by energizing both relays 40 and 50. Thus, when input lead 56 to relay coil 51 is energized, the diode 58 which is connected between coils 41 and 51 applies power to operate relay coil 41. The contacts 52 and 53 of the relay 50 are connected to reverse the connections of the field winding 22, so when relay 50 is energized the power applied through the contacts 42 of relay 40 effects rotation of the motor 20 in the opposite direction.

Power for the operation of the relays 40 and 50, the clutch 30, the brake 35 and the turret indexing solenoid 60 is applied through a double pole, double throw switch 62. In the "manual" position of the switch, the relay operating power, which may for convenience be a source of −28 volts D.C., is applied only to the indexing solenoid 60 and retracts the plunger 65 from the turret to permit the manual rotation of the turret on the shaft 11. In the "remote" position of the switch 62, the source of −28 v. D.C. is applied to the relays 40 and 50 and through the relay contacts 43 of the relay 40 for application to other parts of the control system upon closing of the relay 40.

Sensing means for determining in which direction the motor 20 is to run to bring the turret 10 to the selected position with the least amount of rotation includes selector switch means which has a first switch portion for providing closed electric circuit paths about a clockwise sector and a second switch portion which provides closed electric circuits about the remaining counterclockwise sector. The switch portions are shown in the figure as comprising the ganged sector or selector switches 70 and 72.

Referring to the switch 70, it is formed with a rotor 74 and a plurality of selectable contacts 75, corresponding in number and placement or spacing to the number and placement or spacing of the selectable positions 15 on the turret 10. The sector switch 72 is similarly configured with a movable switch member or rotor 77 and provided with corresponding selectable electrically isolated contacts 78, corresponding in placement and number to the contacts 75 of the switch 70. The rotor 74 of the switch 70 is provided with a conducting or shorting portion 80 which provides electrical contact with a clockwise portion or segment of the contact 75. Similarly, the switch 72 is provided with an arcuate conducting portion 82 of the rotor 77 which provides closed electrical circuit paths to the remaining counterclockwise portions of the selectable contacts 78. The switch rotors 74 and 77 define therebetween an open portion or a non-conductive portion at 85 which coincides with the contact in each of the switch sections which represents the position of the turret 10. In other words, the total number of closed switch paths encompassed by the rotors 74 and 77 of the switches 70 and 72 is one less than the total number of possible turret positions, with the switch position which coincides with the station 16 being at the common open sector 85 defined between the shorting portions 80 and 82 of the rotors 74 and 77.

The rotary portions of each of the switch sections 70 and 72 are connected for synchronous rotation with the shaft 11. Preferably, the rotors are ganged on a common shaft driven directly from the shaft 11 so that the single contact of the switch which is open and not shorted by one or the other of the rotors is the contact which coincides with the station 16.

A third wafer or selector switch indicated at 90 also includes selectable contacts 91 which correspond to in number and spacing the selectable stations on the turret. The rotor 92 is formed with a single contacting portion 94 which closes an electric circuit path to the single one of the contacts 91 representing the position of the turret 10. The width of the contact sector 94 of the switch 90 is purposely made narrower than the effective gap 85 between the contacting sectors 80 and 82 of the switches 70 and 72, to assure that the circuit established by one of the switches 70 or 72 is broken before the circuit is made by the switch 90. The rotor 92 of the switch 90 is also connected for rotation with the shaft 11 and is preferably ganged on the same shaft with the switches 70 and 72.

Remote operator selector switch means includes a fourth selector switch 100 which also has selectable contacts 101 corresponding in number only to the selectable positions or stations about the member 10. The switch 100 also has a grounded rotor 102 which corresponds generally to the rotor 92 of the switch 90 in that it includes a single contacting portion 104 effective to apply a ground to a single one of the contacts 101.

Each corresponding selectable contact of each of the switches 70, 72, 90 and 100 are connected to each other in parallel so that the selection of any position by the switch 100 applies a ground signal to each corresponding control of the switches 70, 72, and 90. The switch 100 may be positioned remote from the turret indexing apparatus and connected by a cable including the parallel connecting leads and the ground lead.

The clockwise and counterclockwise inputs of the motor 20 are connected respectively to the rotors of the switches 70 and 72. Thus, the coil 41 is connected by a lead 105 to the rotor 74, and the coil 51 is connected by lead 106 to the rotor 77, for respective energization through the switches 70 and 72.

The switch rotor 92 of the switch 90 is connected to operate a clutch-brake relay 110 through an intermediate switch 115 which is connected for synchronous rotation or operation with the output shaft of the clutch 30. The ratio of the gearing 32 intermediate the clutch and brake is made such that the switch 115 moves through a single circuit closing position for each station about the turret 10. Therefore, with a switch 115 being constructed with a single contacting lobe 116, the switch 115 must make one full revolution between each station 15 about the turret 10 and accordingly, the gear ratio of the gear box 32 is ten to one. It is obvious, of course, that additional contacting sectors or lobes may be formed on the switch 115 with a corresponding difference in ratio within the reduction gearing 32.

The clutch-brake relay 110 may be constructed similarly to the relays 40 and 50 to include two pairs of contacts 120 and 121. In the released position of the relay 110, as shown, a circuit path is provided from the −28 v. D.C. source to the clutch 30 through the contacts 120 when switch 130 is closed by the retraction of the solenoid plunger 65. When the relay 110 is energized, this circuit is broken to the clutch and power is applied to the brake 35.

Switch means responsive to the operation of the indexing solenoid 60 include a pair of normally open switches 130 and 131 which are closed when the solenoid is operated concurrently with the indexing movement of the turret 10, by relay 40. Switch 130 is connected to the relay 110 and operates to close an energizing circuit from the switch 62 to the relay 110 so that it is ready for operation at the conclusion of the cycle of operation. Switch 131 provides a temporary holding circuit for the solenoid 60 through the closed contacts 121 to assure that the clutch-brake relay 110 operates before the indexing solenoid 60 is released. That is, the relay 110 must operate to apply the brake 35 before the solenoid plunger 65 is released.

The operation of the invention may be most readily understood by considering that the turret 10 is at rest and indexed at position number one, and that the operator, for example, has selected position number four by rotating his selector switch 100 to apply a ground to contact number four. This results in the application of a ground circuit to the number four contacts of each of the switches 70, 72 and 90. However, only the clockwise selector 80 of switch 70 makes a closed circuit path to ground through its contact number four, thereby resulting in the grounding and the operation of relay 40. Contacts 43 of relay 40 apply −28 v. D.C. to the index solenoid 60 through switch 62 thereby effecting the retraction of the indexing plunger 65. Simultaneously, the contacts 42 energize the motor 20 to drive the turret 10 through the gear train represented by the reduction gearing 26 and 32 to rotate the turret 10 in the clockwise sense, as viewed in the drawing.

The clutch 30 is energized through the normally closed contacts 120 of the clutch-brake relay 110, and the switch 130 which was closed by the retracting movement of the plunger 65. Thus, the turret 10 will continue to rotate until the circuit established by the rotor sector 74 is broken. At that time, the relay 40 is released and power is removed from the motor 20, and the entire gear train system is left temporarily in a coasting condition. However, the indexing solenoid 60 is not yet released since it is now self-holding through relay contacts 121 and switch contacts 131.

In a very short time following the opening of the motor drive circuit, the rotor of the switch 90 closes a circuit with its number four contact thereby applying a ground through the fine brake switch 115 to the clutch-brake relay 110 and momentarily energizing the relay to apply power to the brake 35 and to release the clutch 30. Since the rotary switch 115 makes one revolution for each position of the turret, it is possible to time accurately the application of the brake so that the turret may be stopped within prescribed limits.

Just as soon as the clutch brake-relay 110 is applied, it opens contacts 121 and breaks the holding circuit to the index solenoid 60 so that the plunger 65 may be returned into engagement with the turret 10. Thus, although the motor relays 40 and 50 are intended to release relatively slowly, the parallel energizing path for the index solenoid 60 through contacts 121 and switch 131, as distinguished from the path through contacts 43, assures that the solenoid is released only after the brake 35 is applied.

Now assume that instead of selecting position number four, the operator has selected position number eight on his selector switch 100. This accordingly applies a ground to position number eight of each of the switches 70, 72 and 90, as described previously. However, the motor 20 will now be energized by reason of the operation of relay 50 through switch 72 to turn in the counterclockwise direction which is the shortest path to the position eight. The diode 58 also energizes relay 40 which applies the motor operating power to the contacts 52, as previously described, and energizes the index solenoid 60, as previously described. The remainder of the cycle operates as described above so that when the sector 82, as driven from the shaft 11, breaks the circuit with the contact number eight, the relays 50 and 40 are deenergized, and the fine brake control is applied through the switch 115, to apply the brake 35 and release the solenoid plunger 65.

It is therefore seen that this invention provides a simplified turret indexing control system for positioning a turret or other rotatable member in any one of a plurality of selectable angular positions by rotation in the direction which is nearest the selected position. Preferably, where possible the turret stations are divided evenly between the clockwise and counterclockwise switch portions 70 and 72. Where there is an even number of turret positions, such as in the embodiment disclosed, it is obvious that a greater number of positions must be controlled by one of the switch sectors than the other, so that when the diametrically opposite station is selected, it will be controlled by only one of the selector switch portion. However, it is within the scope of this invention, to attribute either a fewer or a greater number of controlled positions to each of the selector switch portions 70 and 72, as desired. Furthermore, it is within the scope of this invention to provide a turret indexing control wherein there is non-uniform spacing between the stations, by correlating the spacing of the selector contacts on the rotary switches with the spacing of the stations on the rotatable member. Not only is it possible to vary the included angles between the shorting portions of the switch rotors 74 and 77, but it is also possible to vary the width of the excluded portion 85 within certain limits. However, it is preferable that this width be somewhat wider than the width of the contact 94 of the switch 90, to assure that the power is interrupted to the motor 20 prior to the release of the clutch and the application of the brake which is effected by the switch 90 in combination with the high speed rotary switch 115.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A turret indexing control system for the control of a reversible turret drive motor for positioning a turret into any one of a plurality of selectable positions by rotation in the direction nearest the selected position, comprising switch means connected for synchronous rotation with said turret and having two series of selectable contacts corresponding to said turret positions and a shorting wiper for each of said contact series with each wiper covering a mutually exclusive sector of said contacts and providing a dead space therebetween corresponding to the actual position of said turret, said turret drive motor having a pair of selectable inputs each effective to cause said turret to turn in a different rotational direction and each input connected to one of said switch wipers, means for selectively energizing any one of said selectable switch contacts for energizing one of said motor inputs through one of said shorting wipers in the sector including the selected contact coresponding to the selected turret position, controllable brake means associated with said turret and operable to stop said turret in said preselected positions, and further switch means having a wiper driven in synchronism with said shorting wipers for controlling operation of said brake means following deenergization of said motor.

2. An indexing system for positioning a rotatable member into any one of a plurality of selectable angular positions, comprising a reversible drive connected in driving relation to said member, first circuit means for energizing said drive to rotate said member in one direction and second circuit means connected to energize said drive for rotation of said member in the opoposite direction, a pair of selector switch means connected for synchronous rotation with said member with each of said means having a plurality of selectable electric switch positions corresponding to said angular positions of said member, each of said switch means providing closed electric circuit paths for the switch positions thereon corresponding to the portion of said member positions respectively clockwise and counterclockwise from the resting position of said member and each encompassing approximately one-half of the corresponding movement of said member with the total number of closed switch paths being one less than the total number of selectable member positions, said first and second drive circuit means connected for energization respectively through said pair of selector switch means, a further selector means having contacts connected to the selectable switch positions of said selector switch means to effect energization of one of said drive circuits through the one of said pair representing the shortest path of rotation for said member to said selected position, an electrical brake connected to said turret, and a further switch means connected to rotate in synchronism with said pair of selector switch means and connected to operate said electric brake upon the deenergization of said reversible drive.

3. An indexing system for positioning a rotatable member into any one of a plurality of selectable angular positions, comprising a reversible drive motor connected in driving relation to said member, first circuit means for energizing said motor to rotate said member in one direction and second cicuit means connected to energize said motor for rotation of said member in the opposite direction, a pair of selector switch means connected for synchronous rotation with said member with each of said means having a plurality of selectable electric switch positions corresponding to said angular positions of said member, each of said switch means providing closed electric circuit paths for the switch positions thereon corresponding to the portion of said member positions respectively clockwise and counterclockwise from the resting position of said member and each encompassing a mutually exclusive sector of a full revolution of said member with the total number of closed switch paths being one less than the total number of selectable member positions, said first and sceond motor circuit means connected for energization respectively through said pair of selector switch means, further selector means having contacts connected to the selectable switch positions of said selector switch means to effect energization of one of said motor circuits through the one of said pair representing the shortest path of rotation for said member to said selected position, a controllable brake on said member, a further switch forming a closed circuit path as each selectable angular position of said member approaches an indexing position, and means connecting said brake for activation through said further switch following the deenergization of said one rotor circuit for indexing said member into said selected position.

4. A turret indexing control for the control of a reversible turret drive for positioning a turret into any one of a plurality of selectable positions by rotation in the direction nearest the selected position, comprising a ganged rotary switch connected for rotation with the turret and having two series of selectable contacts with each of said contact series corresponding in number and in spacing to the selectable positions of said turret, a rotating shorting wiper for each of said contact series and each engaging a mutually exclusive sector of the respective contacts and providing a common open contact therebetween corresponding to the actual position of said turret, control means for said reversible drive means having a pair of selectable inputs for effecting drive of said turret in each of said directions with each of said inputs being connected to a different one of said switch wipers, a further selector switch having means for the selective energization of a given contact in each of said series of contacts for energization of one of said motor inputs through one of said shorting wipers which represents the shortest direction of rotation to the selected position, a further series of contacts on said ganged switch and a further rotor for said further series having a contactor connected to move with said turret to select the contact of said further contact series corresponding to said turret position, the effective width of said contactor being less than the effective width of said open contact defined by said shorting wipers, and brake means on said turret energized through said further switch means following the opening of the circuit to said drive means.

References Cited by the Examiner
UNITED STATES PATENTS

| | | | |
|---|---|---|---|
| 1,476,914 | 12/1923 | Oakley | 318—33 X |
| 2,085,442 | 6/1937 | Newell. | |
| 3,062,997 | 11/1962 | Loyd | 318—467 |

JOHN F. COUCH, *Primary Examiner.*